United States Patent [19]

Wilson

[11] Patent Number: 4,989,036
[45] Date of Patent: Jan. 29, 1991

[54] FILM DUPLICATOR

[75] Inventor: William B. Wilson, Hamlin, N.Y.

[73] Assignee: Eastman Kodak Company, Rochester, N.Y.

[21] Appl. No.: 503,505

[22] Filed: Apr. 2, 1990

[51] Int. Cl.$^5$ .............................................. G03B 27/30
[52] U.S. Cl. ..................................... 355/106; 271/245
[58] Field of Search ............... 355/100, 104, 105, 106, 355/110, 309; 354/302; 271/245

[56] References Cited

U.S. PATENT DOCUMENTS

| | | | |
|---|---|---|---|
| 3,022,716 | 2/1962 | Smith, Jr. et al. | 355/106 |
| 3,186,325 | 6/1965 | De Belder | 354/302 |
| 3,416,863 | 12/1968 | Ralston | 355/110 |
| 3,419,328 | 12/1968 | Klosky et al. | 355/106 |
| 3,535,039 | 10/1970 | Lakin et al. | 355/100 |
| 3,891,318 | 6/1975 | Touchette | 355/100 |
| 4,176,949 | 12/1979 | Burgess | 355/104 |
| 4,515,470 | 5/1985 | Deckers et al. | 355/105 |
| 4,530,590 | 7/1985 | Kawai | 355/309 X |
| 4,634,269 | 1/1987 | Welp et al. | 355/100 |
| 4,640,507 | 2/1987 | Ohgoda et al. | 271/245 |

Primary Examiner—Richard A. Wintercorn
Attorney, Agent, or Firm—G. Herman Childress

[57] ABSTRACT

In a film duplicator original and copy sheets are initially brought together in unaligned relationship and permitted to drop under the influence of gravity along a predetermined path past an exposure station and into an alignment box where the ends of the sheets strike the bottom of the box to align the sheets. The aligned sheets are then transported back to the exposure station to expose the copy sheet. The sheets are then separated and exited from the duplicator.

6 Claims, 1 Drawing Sheet

FILM DUPLICATOR

BACKGROUND OF THE INVENTION

1. Field of the Invention

This invention relates to film duplicators and more specifically to a duplicator having a simple reliable film feeding means.

2. Description of the Prior Art

In a film duplicator, an original film sheet is brought into contact with a duplicate or copy film sheet and then exposed to light to transfer the image to the copy film sheet. In such apparatus, it has been necessary to transport the sheets into contact, accurately align the sheets, transport them past a light source, and then separate the sheets.

Prior art apparatus for carrying out this process are relatively complicated structurally particularly with respect to apparatus for aligning the film sheets prior to exposure. Typical duplicating apparatus are disclosed in U.S. Pat. Nos. 4,515,470, 4,640,507, 4,530,590, 3,186,325, 3,535,039, 3,891,318, and 4,634,269.

SUMMARY OF THE INVENTION

In accordance with the invention, an original film sheet and a copy film sheet are simply brought together in unaligned relationship and permitted to drop under the influence of gravity along a predetermined path past an exposure station into engagement with an abutment to align the sheets. The aligned sheets are then transported back past the exposure station to expose the copy sheet and are subsequently separated.

BRIEF DESCRIPTION OF THE DRAWINGS

Other advantages of the present invention will become apparent from the following detailed description of a preferred embodiment taken in connection with the accompanying drawing which is a schematic illustration of a film duplicator in accordance with the invention.

DETAILED DESCRIPTION OF THE INVENTION

Figure 1:
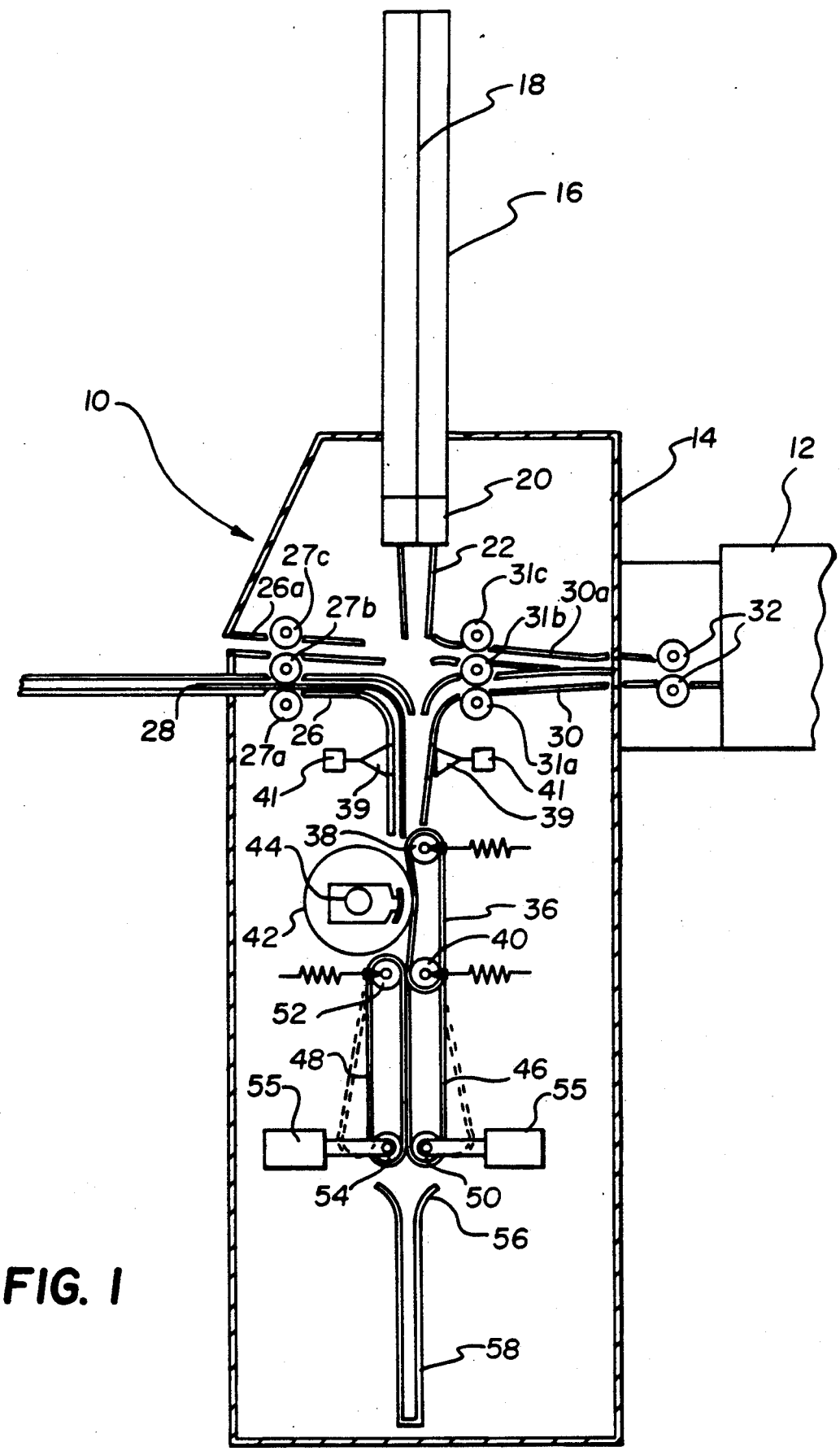

Referring to the drawing, there is shown a film duplicator 10 positioned adjacent a film processor 12. The duplicator 10 comprises a housing 14 having a light-tight magazine 16 suitably mounted on the top thereof and adapted to contain light sensitive unexposed film sheets 18 hereinafter referred to as copy sheets. The copy sheets 18 are adapted to be dispensed one by one by a suitable dispensing means 20 into a discharge chute 22. Since such dispensing means are well known in the art and form no part of the present invention, further description is deemed unnecessary. Also, the drive means for the various movable parts described below may take various forms well known to those skilled in the art and a specific disclosure is also deemed unnecessary.

A central sheet film combining and separating means within the duplicator comprises a structure having an upper inlet 24 for receiving copy sheets from the film magazine 16, an inlet conduit 26 for receiving from nip rollers 27a and 27b, an original film sheet 28 to be duplicated, an outlet conduit 30 for feeding exposed copy sheets 18 through nip rollers 31a and 31b into the entrance rollers 32 of the film processor 12 and a central vertical conduit 34 for receiving an original sheet 28 from inlet conduit 26 and a copy sheet 18 from magazine 16 in side-by-side relationship. From conduit 34, the two sheets 18 and 28 will move together into the nip between a moving belt 36 mounted on a pair of rollers 38 and 40 and a rotatable transparent drum 42 containing a light source 44. As will be later described in more detail, the belt 36 serves to transport film sheets 18 and 28 around the drum 38.

A second inlet conduit 26a and a third nip roller 27c engaging upper roller 27b defines a second inlet for receiving exposed film sheets to be merely processed and not duplicated. Such sheets will be transported into and an outlet conduit 30a to be received between a nip roller 31c engaging the upper nip roller 31b. The upper roller 31b and roller 31c will thus transport the exposed sheet directly into the processor 12.

A pair of film suction cup separators 39 are positioned on opposite sides of the film path and are movable inwardly by solenoids 41 to engage the original and copy sheets after exposure of the copy sheet for the purpose of separating the sheets as will be described in more detail below.

A pair of belts 46 and 48 are mounted on opposite sides of the film path between the exposure station defined by drum and an alignment box. One belt 46 is supported by a portion of roller 40 and a roller 50. The second belt 48 is supported by rollers 52 and 54.

The rollers 38 and 40 are spring biased as indicated schematically to cause belt 36 to engage drum 42 and the belts 36 and 48 to contact between rollers 40 and 52. Rollers 50 and 54 are also spring biased to produce contact between the belts supported by the two rollers but are also suitably mounted to be movable by solenoids 55 or other suitable means to the positions shown in dashed lines to thus displace the belts 46 and 48 to the positions shown in dashed lines. As will later be described in more detail, such displacement will permit movement of an original and a copy film sheet into the entrance 56 of an alignment box 58 under the influence of gravity.

In operation of the duplicator the drive means for rollers 38, 40, 52, 54 and 50 are initially inactive so that the belts 36, 48 and 46 are stationary. However, rollers 50 and 54 and belts 46 and 48 are displaced to their dashed position by solenoids 55. The drive means for rollers 27a and 27b are initially activated to rotate roller 27a clockwise and roller 27b counterclockwise and an original sheet 28 to be copied is fed by an operator into sheet inlet 26 from which it is transported by nip rollers 27a and 27b into the central main conduit 34. The dispensing means 20 is actuated to dispense a copy sheet 18 so that it will exit discharge chute 22 and enter the main conduit 34 in side-by-side relationship and in approximate alignment with the original sheet in central vertical conduit 34. Rollers 38 and 40 will now be activated to drive belt 36 counterclockwise. The two sheets will be transported by belt 36 around drum 42 which will rotate under the influence of the frictional driving forces and into the nip between belts 46 and 48. Because belts 46 and 48 are in the positions shown in dashed lines, once the upper ends of the two sheets pass between rollers 40 and 52 the sheets will fall under the influence of gravity into the alignment box 58. The lower ends of the sheets will strike the bottom of the box 48 causing any necessary relative displacement of the sheets to accurately align them.

After alignment of the sheets, the drive means for rollers 38, 40, 52, 50 and 54 will be reversed to reverse the direction of movement of all belts and the rollers 50 and 54 will be displaced to the positions shown in solid lines to close the belts 46 and 48 on the upper portions of the film sheets. The belts 46 and 48 will thus engage the upper portions of the sheets and transport them in alignment upward toward drum 42. Subsequently, belt 36 will transport the sheets around drum 42. Light source 44 will be turned on to cause exposure of the copy sheet as the sheets move around the drum. The light source 44 will be turned off when the sheets leave the drum.

When the upward edges of the sheets move past the suction cups 39, both cups will be moved toward the film sheets by solenoids 41 to cause one cup to engage the sheet 28 and the other to engage the copy sheet 18. Return of the cups to their initial position will move sheet 28 into alignment with the entrance to the original inlet 26 and sheet 18 into alignment with the entrance to the outlet conduit 30. Further movement of the sheets will thus cause sheet 28 to enter conduit 26 and sheet 18 to enter conduit 30. The direction of rotation of rollers 27a and 27b will now be reversed and sheet 28 will be engaged by and transported by rollers 27a and 27b out of the duplicator. The drive means for rollers 31a and 31b will be activated to drive rollers 31a and 31b clockwise and counterclockwise, respectively, and copy sheet 18 will be engaged and transported to the film processor entrance rollers 32. The cycle can then be repeated with another original sheet.

If it is desired to merely process an exposed sheet, the drive means for rollers 27b and 27c will be activated to drive rollers 27b and 27c clockwise and counterclockwise, respectively. Similarly, the drive means for rollers 31b and 31c will be activated to drive rollers 31b and 31c clockwise and counterclockwise, respectively. An exposed sheet may then be inserted into inlet 26a for transport directly into the nip rollers 32 of the processor 12.

It will be apparent that the disclosed duplicator provides a simple and reliable alignment means for aligning original and copy sheets prior to copying. Since the alignment occurs by action of gravity, there is little chance of poor alignment due to part malfunction.

While the invention has been particularly shown and described with reference to a preferred embodiment thereof, it will be understood by those skilled in the art that various changes may be made without departing from the scope of the invention defined by the appended claims.

I claim:

1. In a film duplicator for producing a copy of an original sheet on a copy sheet, the combination comprising:
    means for positioning said sheets in approximate face-to-face relationship;
    copying means;
    an alignment means below said copying means for aligning said sheets under the influence of gravity;
    means for transporting said sheets along a sheet path past said copying means to said alignment means; and
    means for transporting said sheets in aligned relationship along said path back to said copying means.

2. In a film duplicator as claimed in claim 1 wherein said alignment means comprises an alignment box positioned below said copying means and said sheets move into said alignment box under the influence of gravity and became aligned when they engage the bottom of said box.

3. In a film duplicator as claimed in claim 2 wherein said means for transporting said sheets back to said copying means comprise a pair of movable belts disposed on opposite sides of the sheet path.

4. In a film duplicator as claimed in claim 3 further including means for displacing said belts away from the sheet path to permit movement of said sheets into said alignment box under the influence of gravity.

5. In a film duplicator for producing a copy of an original sheet on a copy sheet through exposure of the sheets to a light source while they are in contact and then processing the copy sheet in a processor, the combination comprising:
    means for receiving an original sheet to be duplicated and a copy sheet in approximate face-to-face alignment;
    copying means;
    an alignment means below said copying means for aligning said sheets under the influence of gravity;
    means for transporting said sheets along a sheet path past said copying means to said alignment means;
    means for transporting said sheets in aligned relationship along said path back to said copying means; and
    means for transporting the copy sheet to the processor.

6. In a film duplicator as claimed in claim 5 further including means for receiving and transporting exposed copy sheets and for transporting them directly to the processor without transport through said path.

* * * * *